United States Patent
Herrmann

(10) Patent No.: US 8,223,785 B2
(45) Date of Patent: Jul. 17, 2012

(54) MESSAGE PROCESSING AND CONTENT BASED SEARCHING FOR MESSAGE LOCATIONS IN AN ASYNCHRONOUS NETWORK

(75) Inventor: Christian Herrmann, Rangendingen (DE)

(73) Assignee: International Business Machines Corporation, Armonk, NY (US)

( * ) Notice: Subject to any disclaimer, the term of this patent is extended or adjusted under 35 U.S.C. 154(b) by 1822 days.

(21) Appl. No.: 11/190,643

(22) Filed: Jul. 26, 2005

(65) Prior Publication Data

US 2006/0056433 A1  Mar. 16, 2006

(30) Foreign Application Priority Data

Sep. 13, 2004 (EP) .................................... 04104419

(51) Int. Cl.
*H04L 12/56* (2006.01)
(52) U.S. Cl. ...................................................... 370/412
(58) Field of Classification Search .......... 370/412–420, 370/428, 389
See application file for complete search history.

(56) References Cited

U.S. PATENT DOCUMENTS

| | | | |
|---|---|---|---|
| 5,627,766 A * | 5/1997 | Beaven | 702/122 |
| 5,668,800 A | 9/1997 | Stevenson | |
| 5,862,336 A * | 1/1999 | Nakagaki et al. | 709/224 |
| 6,072,867 A * | 6/2000 | Lieuwen | 379/220.01 |
| 6,493,826 B1 * | 12/2002 | Schofield et al. | 726/22 |
| 6,654,805 B1 * | 11/2003 | Aldred et al. | 709/224 |
| 7,043,644 B2 * | 5/2006 | DeBruine | 713/153 |
| 7,046,807 B2 * | 5/2006 | Hirano et al. | 380/234 |
| 2003/0134618 A1 * | 7/2003 | Pradhan et al. | 455/412 |
| 2005/0080858 A1 * | 4/2005 | Pessach | 709/206 |
| 2005/0203673 A1 * | 9/2005 | El-Hajj et al. | 701/1 |
| 2006/0092920 A1 * | 5/2006 | Karamchedu et al. | 370/352 |
| 2007/0055766 A1 * | 3/2007 | Petropoulakis et al. | 709/224 |

* cited by examiner

*Primary Examiner* — Man Phan
*Assistant Examiner* — Kevin Lee
(74) *Attorney, Agent, or Firm* — Steven M. Greenberg, Esq.; Carey, Rodriguez, Greenberg & O'Keefe

(57) ABSTRACT

Systems, methods, and computer program products for processing messages and searching for locating messages in an asynchronous messaging network by using content based message tracking. The message descriptor of each message is extended by a content key generated by the message generating application. The content key provides search information derived from application data contained in the message body. Each message queuing system is extend by a message trace component that administers a message trace queue and adds entries in the message trace queue for each operation of a message, and by a message search component that provides the functionality to search for the current location of a specified message as well as to retrieve a trace of the movement of the message.

7 Claims, 19 Drawing Sheets

| MsgID | PutTime | TraceTime | Op | SQ | TQS | TQ | UID |
|---|---|---|---|---|---|---|---|
| xyz | 07-06-2004-<br>12:01:00.123 | 07-06-2004-<br>12:01:01.123 | Put | Q13 | --- | --- | xyz070620041201001023 |

| UID | Label | Value |
|---|---|---|
| xyz070620041201001023 | Fld1 | IBMADEFF |
| xyz070620041201001023 | Fld2 | FE037A2104BA0C4589DE0E7E |

| MsgID | PutTime | TraceTime | Op | SQ | TQS | TQ | UID |
|---|---|---|---|---|---|---|---|
| xyz | 07-06-2004-12:01:00.123 | 07-06-2004-12:01:01.123 | Put | Q13 | --- | --- | xyz07062004120100123 |
| xyz | 07-06-2004-12:01:00.123 | 07-06-2004-12:01:20.023 | Snd | Q13 | QM2 | Q21 | xyz07062004120100123 |

| UID | Label | Value |
|---|---|---|
| xyz07062004120100123 | Fld1 | IBMADEFF |
| xyz07062004120100123 | Fld2 | FE037A2104BA0C4589DE0E7E |

| MsgID | PutTime | TraceTime | Op | SQ | TQS | TQ | UID |
|---|---|---|---|---|---|---|---|
| xyz | 07-06-2004-12:01:00.123 | 07-06-2004-12:01:21.100 | Rcv | Q21 | QM1 | - - - | xyz07062004120100123 |

| UID | Label | Value |
|---|---|---|
| xyz07062004120100123 | Fld1 | IBMADEFF |
| xyz07062004120100123 | Fld2 | FE037A2104BA0C4589DE0E7E |

| MsgID | PutTime | TraceTime | Op | SQ | TQS | TQ | UID |
|---|---|---|---|---|---|---|---|
| xyz | 07-06-2004-12:01:00.123 | 07-06-2004-12:01:21.100 | Rcv | Q21 | QM1 | --- | xyz07062004120100123 |
| xyz | 07-06-2004-12:01:00.123 | 07-06-2004-12:01:43.104 | Get | Q21 | --- | --- | xyz07062004120100123 |

| UID | Label | Value |
|---|---|---|
| xyz07062004120100123 | Fld1 | IBMADEFF |
| xyz07062004120100123 | Fld2 | FE037A2104BA0C4589DE0E7E |

| MsgID | PutTime | TraceTime | Op | SQ | TQS | TQ | UID |
|---|---|---|---|---|---|---|---|
| xyz | 07-06-2004-12:01:00.123 | 07-06-2004-12:01:21.100 | Rcv | Q21 | QM1 | --- | xyz07062004120100123 |
| xyz | 07-06-2004-12:01:00.123 | 07-06-2004-12:01:43.104 | Get | Q21 | --- | --- | xyz07062004120100123 |
| xyz | 07-06-2004-12:01:00.123 | 07-06-2004-12:01:49.315 | Put | Q22 | --- | --- | xyz07062004120100123 |

| UID | Label | Value |
|---|---|---|
| xyz07062004120100123 | Fld1 | IBMADEFF |
| xyz07062004120100123 | Fld2 | FE037A2104BA0C4589DE0E7E |

| MsgID | PutTime | TraceTime | Op | SQ | TQS | TQ | UID |
|---|---|---|---|---|---|---|---|
| xyz | 07-06-2004-12:01:00.123 | 07-06-2004-12:01:21.100 | Rcv | Q21 | QM1 | - - - | xyz07062004120100123 |
| xyz | 07-06-2004-12:01:00.123 | 07-06-2004-12:01:43.104 | Get | Q21 | - - - | - - - | xyz07062004120100123 |
| xyz | 07-06-2004-12:01:00.123 | 07-06-2004-12:01:49.315 | Put | Q22 | - - - | - - - | xyz07062004120100123 |
| xyz | 07-06-2004-12:01:00.123 | 07-06-2004-12:01:51.455 | Get | Q22 | - - - | - - - | xyz07062004120100123 |

| UID | Label | Value |
|---|---|---|
| xyz07062004120100123 | Fld1 | IBMADEFF |
| xyz07062004120100123 | Fld2 | FE037A2104BA0C4589DE0E7E |

| MsgID | PutTime | TraceTime | Op | SQ | TQS | TQ | UID |
|---|---|---|---|---|---|---|---|
| xyz | 07-06-2004-12:01:00.123 | 07-06-2004-12:01:21.100 | Rcv | Q21 | QM1 | --- | xyz07062004120100123 |
| xyz | 07-06-2004-12:01:00.123 | 07-06-2004-12:01:43.104 | Get | Q21 | --- | --- | xyz07062004120100123 |
| xyz | 07-06-2004-12:01:00.123 | 07-06-2004-12:01:49.315 | Put | Q22 | --- | --- | xyz07062004120100123 |
| xyz | 07-06-2004-12:01:00.123 | 07-06-2004-12:01:51.455 | Get | Q22 | --- | --- | xyz07062004120100123 |
| xyz | 07-06-2004-12:01:00.123 | 07-06-2004-12:01:52.695 | Put | Q23 | --- | --- | xyz07062004120100123 |

| UID | Label | Value |
|---|---|---|
| xyz07062004120100123 | Fld1 | IBMADEFF |
| xyz07062004120100123 | Fld2 | FE037A2104BA0C4589DE0E7E |

| MsgID | PutTime | TraceTime | Op | SQ | TQS | TQ | UID |
|---|---|---|---|---|---|---|---|
| xyz | 07-06-2004-12:01:00.123 | 07-06-2004-12:01:21.100 | Rcv | Q21 | QM1 | --- | xyz07062004120100123 |
| xyz | 07-06-2004-12:01:00.123 | 07-06-2004-12:01:43.104 | Get | Q21 | --- | --- | xyz07062004120100123 |
| xyz | 07-06-2004-12:01:00.123 | 07-06-2004-12:01:49.315 | Put | Q22 | --- | --- | xyz07062004120100123 |
| xyz | 07-06-2004-12:01:00.123 | 07-06-2004-12:01:51.455 | Get | Q22 | --- | --- | xyz07062004120100123 |
| xyz | 07-06-2004-12:01:00.123 | 07-06-2004-12:01:52.695 | Put | Q23 | --- | --- | xyz07062004120100123 |
| xyz | 07-06-2004-12:01:00.123 | 07-06-2004-12:01:52.876 | Snd | Q23 | QM3 | Q31 | xyz07062004120100123 |

| UID | Label | Value |
|---|---|---|
| xyz07062004120100123 | Fld1 | IBMADEFF |
| xyz07062004120100123 | Fld2 | FE037A2104BA0C4589DE0E7E |

| MsgID | PutTime | TraceTime | Op | SQ | TQS | TQ | UID |
|---|---|---|---|---|---|---|---|
| xyz | 07-06-2004-12:01:00.123 | 07-06-2004-12:01:53.120 | Rcv | Q32 | QM2 | --- | xyz07062004120100123 |

| UID | Label | Value |
|---|---|---|
| xyz07062004120100123 | Fld1 | IBMADEFF |
| xyz07062004120100123 | Fld2 | FE037A2104BA0C4589DE0E7E |

| MsgID | PutTime | TraceTime | Op | SQ | TQS | TQ | UID |
|---|---|---|---|---|---|---|---|
| xyz | 07-06-2004-12:01:00.123 | 07-06-2004-12:01:53.120 | Rcv | Q32 | QM2 | --- | xyz07062004120100123 |
| xyz | 07-06-2004-12:01:00.123 | 07-06-2004-12:01:54.104 | Get | Q32 | --- | --- | xyz07062004120100123 |
| xyz | 07-06-2004-12:01:00.123 | 07-06-2004-12:01:55.315 | Put | Q33 | --- | --- | xyz07062004120100123 |

| UID | Label | Value |
|---|---|---|
| xyz07062004120100123 | Fld1 | IBMADEFF |
| xyz07062004120100123 | Fld2 | FE037A2104BA0C4589DE0E7E |

| MsgID | PutTime | TraceTime | Op | SQ | TQS | TQ | UID |
|---|---|---|---|---|---|---|---|
| xyz | 07-06-2004-12:01:00.123 | 07-06-2004-12:01:53.120 | Rcv | Q32 | QM2 | --- | xyz07062004120100123 |
| xyz | 07-06-2004-12:01:00.123 | 07-06-2004-12:01:54.104 | Get | Q32 | --- | --- | xyz07062004120100123 |
| xyz | 07-06-2004-12:01:00.123 | 07-06-2004-12:01:55.315 | Put | Q33 | --- | --- | xyz07062004120100123 |
| xyz | 07-06-2004-12:01:00.123 | 07-06-2004-12:01:55.925 | Snd | Q33 | QM4 | Q41 | xyz07062004120100123 |

| UID | Label | Value |
|---|---|---|
| xyz07062004120100123 | Fld1 | IBMADEFF |
| xyz07062004120100123 | Fld2 | FE037A2104BA0C4589DE0E7E |

| MsgID | PutTime | TraceTime | Op | SQ | TQS | TQ | UID |
|---|---|---|---|---|---|---|---|
| xyz | 07-06-2004-12:01:00.123 | 07-06-2004-12:01:56.020 | Rcv | Q41 | QM3 | - - - | xyz07062004120100123 |

| UID | Label | Value |
|---|---|---|
| xyz07062004120100123 | Fld1 | IBMADEFF |
| xyz07062004120100123 | Fld2 | FE037A2104BA0C4589DE0E7E |

MESSAGE PROCESSING AND CONTENT BASED SEARCHING FOR MESSAGE LOCATIONS IN AN ASYNCHRONOUS NETWORK

FIELD OF THE INVENTION

The present invention relates to message queuing in an asynchronous messaging network, and in particular to methods, systems, and computer program products for processing messages and searching for the locations of messages in such a messaging network.

BACKGROUND

It is increasingly common to distribute a data processing operation over a plurality of data processing units, with each of the units communicating over a data communications network such as the Internet. One reason for this is that a particular data processing unit may be able to do a job better than another, so a first unit makes a request for a second unit to do a particular job and then to return the result to the first unit.

It is also very common to have a large number of intermediate data processing units (also known as "nodes") between the originating unit that makes a request and the destination unit that is being asked to do the work. Each intermediate unit receives the request, performs some initial processing to determine what to do with it, and then forwards it on to the next unit.

A popular mechanism for carrying out such distributed data processing is called asynchronous message queuing, where applications communicate with each other by sending messages to queues, which can then be accessed by the receiving application at a time that is convenient for the receiving application. IBM's WebSphere MQ (trademark) software product, which has been on the market for a number of years, is the most popular example of this type of software.

Frequently, messages which flow between data processing units in an asynchronous message queuing network are considered "high value" messages. For such messages, it is very important for the originating data processing unit to be able to locate such messages, should they become lost on their way to the destination unit. The term "lost" is taken to mean that the message is safe, but its location is unknown. A message could be lost, for example, if a link is broken between units, or if the target messaging address is not known on one of the intermediate nodes, or the message is waiting to be processed by an application but the application is currently not available or is running with bad performance. In such situations, the message will be unable to advance towards the destination unit in a reasonable time until either the link is repaired, or the routing (i.e., address resolution) configuration on the node in error is corrected, or the performance bottleneck is removed, or the failing applications are restarted.

The only way known in the prior art to locate such lost messages is to have an operator "visit" (either physically or electronically) each of the nodes of the messaging network and search through the various message queues (e.g., the dead letter queues (DLQs) and the transmission queues (TXQs)). However, this is obviously very time consuming and inefficient. Various prior art teachings have employed a test message which is sent by an originating data processing unit into the network of intermediate units on its way to a destination unit. The test message arrives at various intermediate units in the network on its way to the destination unit, and reports are sent back to the originating unit by each intermediate unit to report the exact path that the test message took on its way through the network. For example, the well known Advanced Peer to Peer Networking (APPN) and TCP/IP (Transmission Control Protocol/Internet Protocol) provide such functionality. U.S. Pat. No. 5,668,800 is another example of such prior art. However, such prior art identifies the path of a test message but does not locate the lost (application) message. Such prior art provides an operator with a possible (but not guaranteed) route that a lost message might have taken.

U.S. Pat. No. 6,654,805 describes an asynchronous message queuing network. A data processing method of finding a lost message includes the steps of: sending a first message from an originating data processing unit to an intermediate data processing unit, the message including an indication that the message is traceable; sending a tracer message from an originating data processing unit to an intermediate data processing unit, the tracer message identifying the first message as a lost message which the originating data processing unit would like to find; at the intermediate data processing unit, upon receiving the tracer message, checking to determine whether the first message exists within the intermediate data processing unit, and sending a reply message back to the originating unit if the first message is found within the intermediate data processing unit; and at the intermediate data processing unit, if the first message is not found within the intermediate data processing unit, determining whether the first message has passed through the intermediate data processing unit, and if the first message has passed through the intermediate data processing unit, determining a neighboring data processing unit which received the first message from the intermediate data processing unit, and forwarding the tracer message to the neighboring data processing unit.

All these prior art methods work only on the message identifiers of the messages, which in most cases are unknown to the business domain users, rather than on the message contents.

SUMMARY

The present invention provides systems, methods, and computer program products for processing messages and searching for the locations of messages in an asynchronous messaging network by using a content based message tracking mechanism.

The message descriptor of a message within the present invention may be extended by a content key generated by the message generating application. The content key provides search information that is derived from the application data contained in the message body. The content key may be encrypted and authenticated as needed. Applications in the same business context are able to create appropriate search requests.

Furthermore, each message queuing system may be extended by a message trace component that administers a message trace queue and adds entries in that message trace queue for each operation of a message. Each entry in the message trace queue contains at least the message id, content key, the time stamp of the entry, and source queue as far as the message is not transferred to another message queuing system. If the message is transferred to another queuing system, the entry contains additionally identifiers of the target queue and target queuing system.

Finally, the message queuing system may be extended by a message search component which provides functionality to search for the current locations of messages as well as to retrieve a trace of the movement of a specified message in the messaging network.

BRIEF DESCRIPTION OF THE DRAWINGS

The above, as well as additional features and advantages of the present invention will be apparent in the following detailed written description. The novel features of the invention are set forth in the appended claims. The invention itself, however, as well as a preferred mode of use, further objectives, and advantages thereof, will be best understood by reference to the following detailed description of an illustrative embodiment when read in conjunction with the accompanying drawings, wherein:

DETAILED DESCRIPTION

Figure 1A:
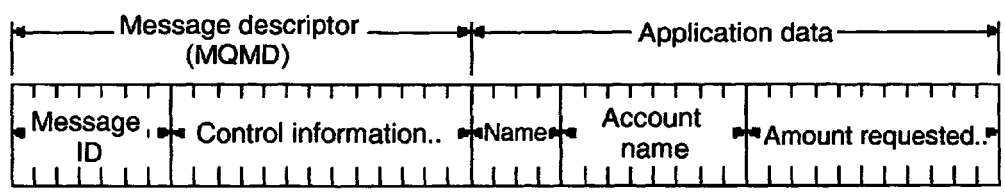
FIG. 1A shows the structure of a message according to the prior art.

FIG. 1A shows the structure of a prior art message. Every message has a message descriptor and a message body. The message descriptor identifies the message (message ID) and contains additional control information such as the type of the message and the priority assigned to the message by the sending application. The message body includes the application data. The content and structure of the application data are defined by the application program that uses them.

Figure 1B:
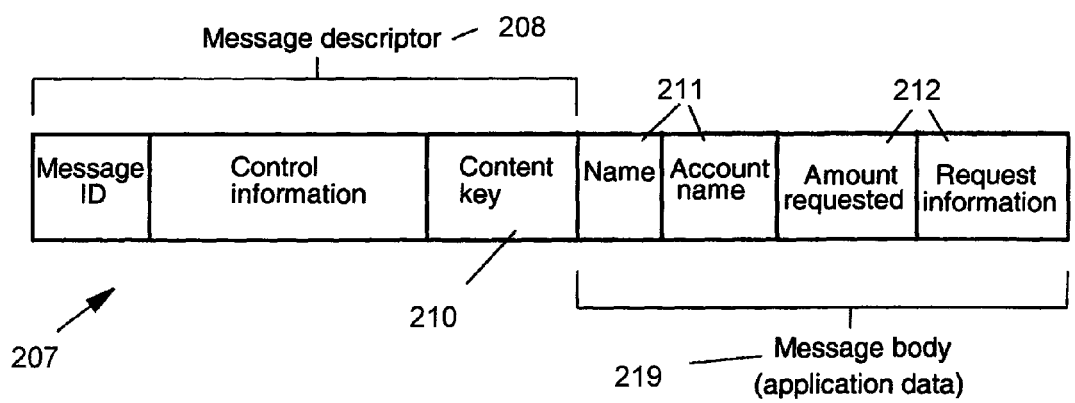
FIG. 1B shows the structure of a message according to the present invention.

FIG. 1B shows the new structure of a message 207 that is generated according to the present invention. Compared with the prior art message structure, the message descriptor 208 is extended by a content key 210. The content key 210 is application and message specific, and has at least one label with its assigned value(s) 211, 212. The label identifies a specific data element derived from the message body 209 or from the message descriptor 208. The value is the content of this data element, and can be encrypted and/or authenticated for security reasons.

Content keys 210 are character strings and binary, e.g. encrypted values, and therefore need to be translated into hexadecimal string representations. Applications of the same business domain know how their content keys 210 are built, and are therefore able to create the appropriate content keys for message searches.

The message descriptor 208 is preferably extended by a variable length field holding a content key 210 created by the application that puts the message in the message queuing system.

Because creating the content key 210 of a message is business-domain specific, it is possible that there may be messages with the same content key 210 in different business domains. In this case, additional information needs to be specified for the message search, e.g. the origin queuing system and queue name.

Examples of content keys are:
content key: #Fld1#100.000.000,00€#Fld2#IBMADEFF
content key: #L1#FE037A2104BA 0C4589 DE0E7E# F3#Daimler Chrysler#F2#Bosch The value of data element L1 in the second example of a content key may be encrypted, e.g. using the public key of the business domain. The true value is not then visible to the outside world, but each application which is member of the business domain can, for example, create the same encrypted value for searching for the message with the appropriate value of data element L1.

Figure 2A:
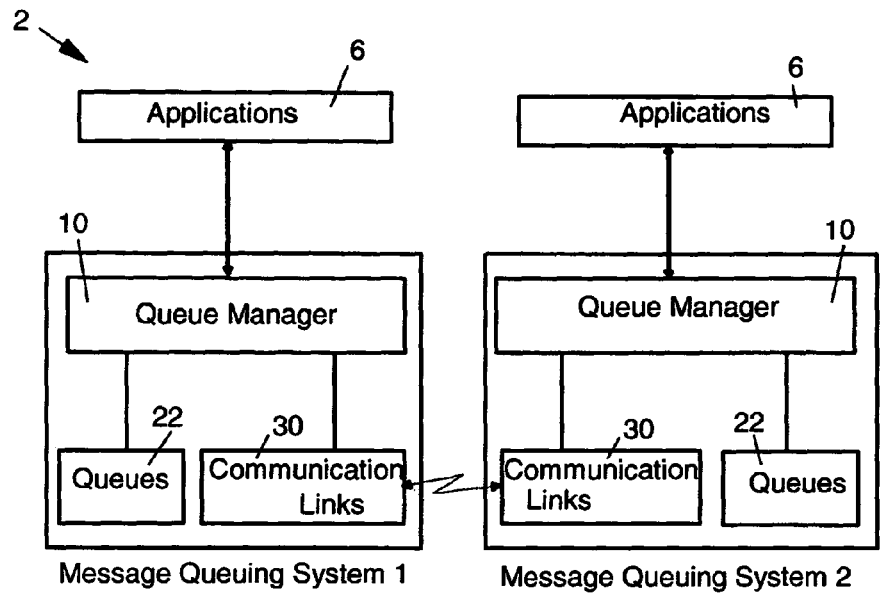
FIG. 2A shows a prior art message queuing system.

FIG. 2A shows a prior art message queuing system 1/2 within a messaging network 2. The application 6 generates messages and sends them to a message queuing system 1/2. The message queuing system 1/2 includes at least a Queue Manager 10, Queues 22, and communication links 30 to other message queuing systems 1/2. A queue 22 is a data structure used to store messages until they are retrieved by an application. Queues 22 are managed by a queue manager 10. The queue manager 10 is responsible for maintaining the queues 22 it owns, and for storing all the messages it receives from application programs or other queue managers onto the appropriate queues, and retrieving the messages in response to application requests.

Queues 22 exist independently of the applications that use them. A queue can exist in main storage if it is temporary, on disk or similar auxiliary storage if it must be kept in case of recovery, or in both places if it is currently being used and must also be kept for recovery.

A message queuing system 1/2 therefore is a system for asynchronous, assured exchange of information in form of messages between applications connected to the system. The message descriptor of the message is known and interpretable by the message queuing system but not the message body whose layout is variable and application dependent. A message queuing system 1/2 therefore stores and transports the messages regardless and without knowledge of the message content in the message body.

Multiple message queuing systems 1/2 can be interconnected in a message queuing network 2 which allows applications on different platforms and different physical locations to easily exchange data without knowledge of the underlying infrastructure.

Figure 2B:
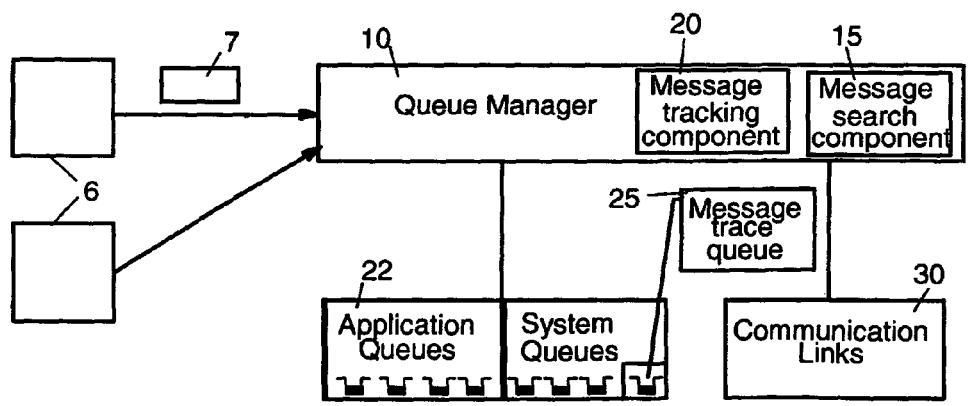
FIG. 2B shows a message queuing system according to the present invention.

FIG. 2B shows a message queuing system extended by the present invention. The new and inventive components are the message tracking component 20, the message trace queue 25, and the message search component 15.

Message tracking component 20 receives message trace information from the queue manager 10 and stores the received message trace information in the message trace queue 25.

Message search component 15 receives message search requests from the queue manager 10 and searches for the appropriate entries in its local message trace queue 25. Additionally, it generates an internal message search request and sends the request to all of its adjacent queue managers. The message search component 15 of each of the queue managers then searches for the requested message trace entry on its local trace queue, and so on. If an appropriate entry is found, it is returned as a reply to the requesting message queuing system, and from this system back to the requesting search application.

Message trace queue 25 stores the message trace information. This information includes the message id, the content key, the operation performed with the message (PUT, GET, SND, RCV), the source queue, and, if the message is either sent or received to or from another message queuing system, identifiers of the target queue and target queuing system. Preferably, a time stamp of the trace entry is also part of the message trace information.

Figure 3:
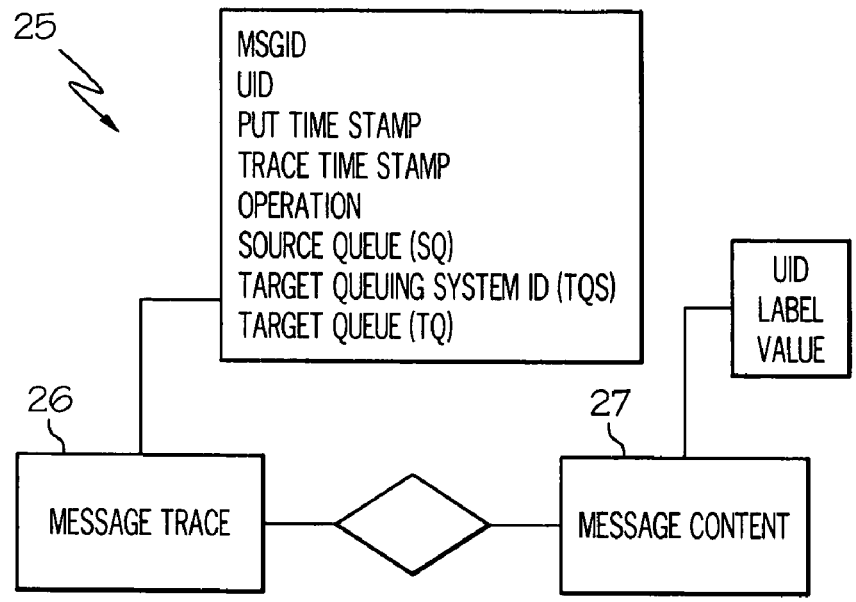
FIG. 3 shows the data model of the inventive message trace queue.

FIG. 3 shows a preferred data model of the inventive message trace queue 25. The message trace queue 25 is preferably implemented in a database. Each message trace queue is preferably represented by two tables, a Message trace table 26 containing one entry for each operation on a traceable message, and a Message Content Table 27 which stores the label, value, and message id of each message only once. Each label value pair of the content key is a separate entry in this table.

If a content key is specified in the message, the message queuing system adds an entry in the specific message trace queue 25 for each put and get of the message. An entry in the message trace queue 25 preferably includes the message descriptor, the operation type (GET, PUT, SND, RCV), the queue name, the queuing system identifier, and the date and time (time stamp) of the operation. If a message is transmitted to another message queuing system, this is also recorded, including the destination message queuing system, in the message trace.

The type of the message trace queue 25 can be configured as linear or circular, which defines how the trace queue content is maintained. With circular operation it is possible that existing entries are overwritten by new trace entries, whereas with linear operation the queue can run out of space. The message trace queue 25 may also be implemented as a file system on a storage medium.

Figure 4A:
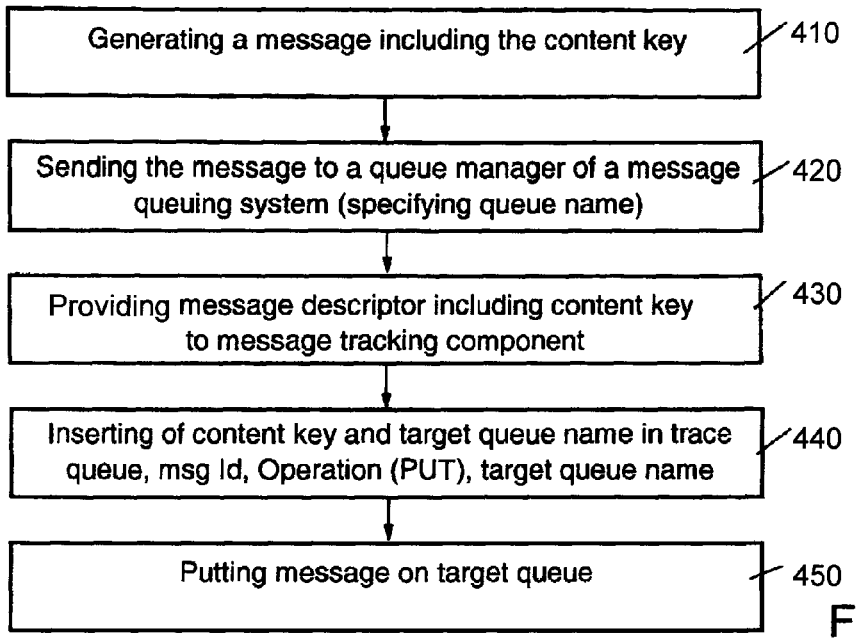
FIG. 4 shows the basic message processing flow including the entries in the message trace queue according to the present invention.
Figure 4B:
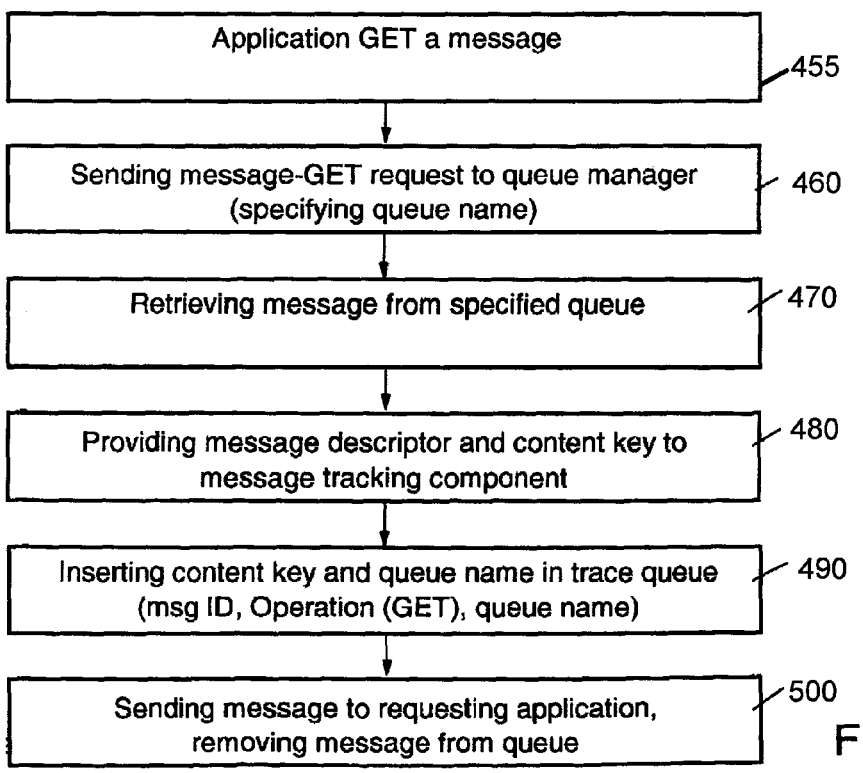
Figures 1, 4C:
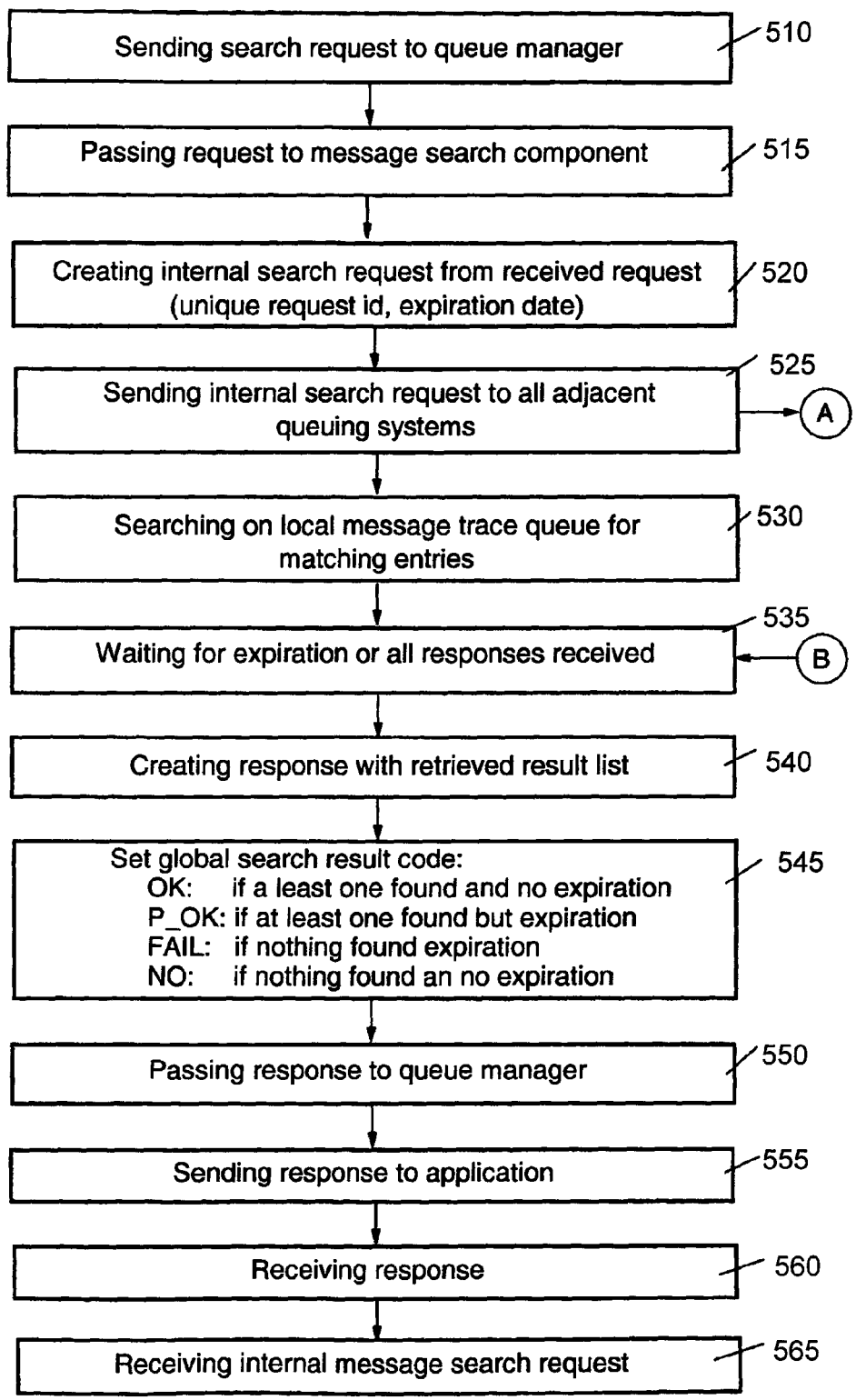
Figures 2, 4C:
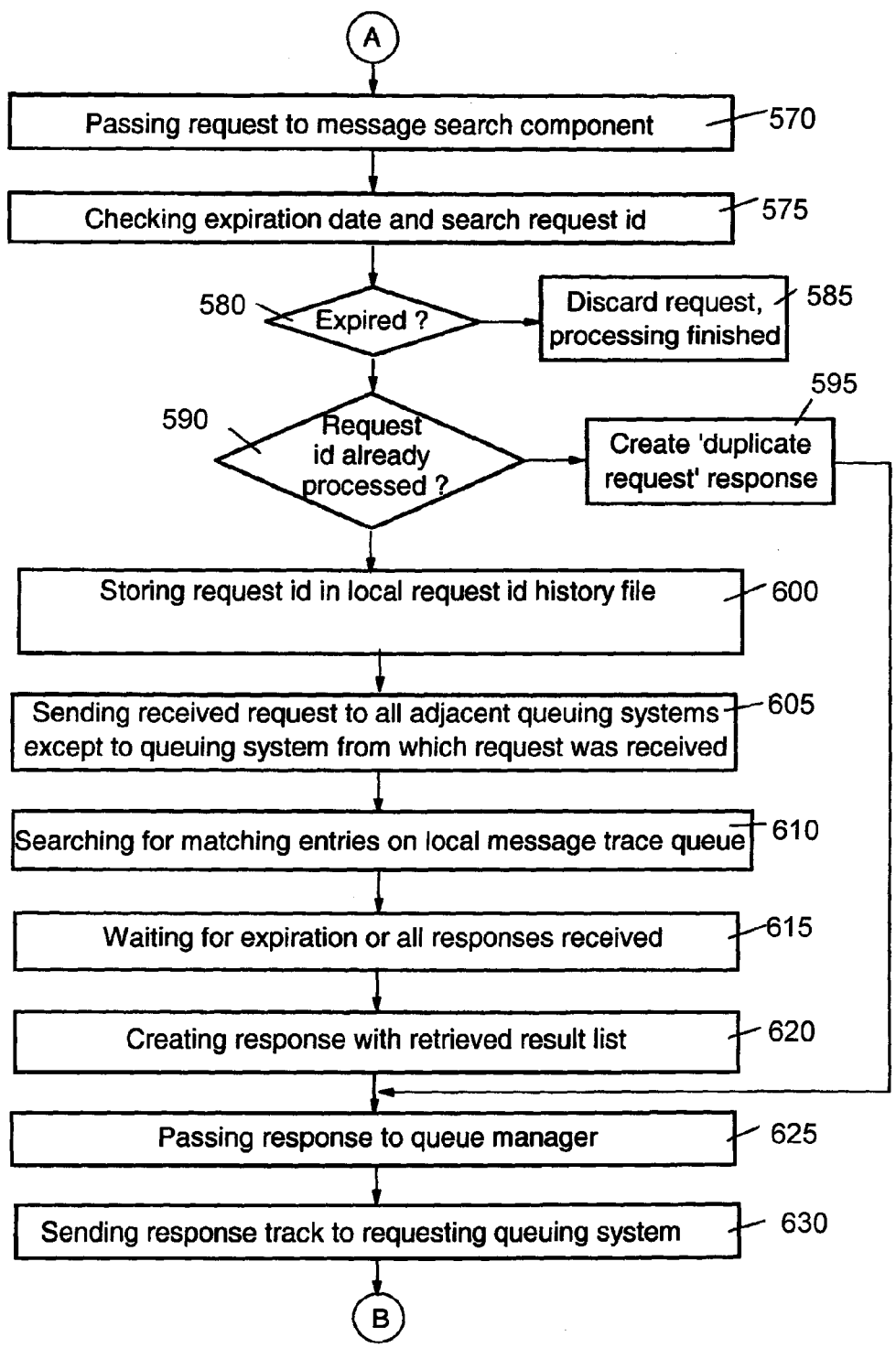

FIG. 4A-C shows the basic message processing flow with its entries in the message trace queue according to the present invention.

FIG. 4A shows the basic message processing flow when a message is sent from an application to a message queuing system according to the present invention.

The message processing flow starts with the generation of a message by an application 410. Each message includes a content key which has been generated by the application and added to the message descriptor. The message is sent to a queue manager of another message queuing system 420.

The queue manager passes the message descriptor, the target queue name, and the operation type PUT to the new message tracking component 430. The message tracking component checks whether a valid content key is in the message descriptor (valid means at least one label—value entry). If so, it creates a new entry in the message trace queue consisting of the message id, the content key, the queue name where the message is put on, and the operation type PUT 440. If the entry is stored successfully on the message trace queue, the queue manager stores the message on the requested queue, and the transaction is committed 450.

FIG. 4B shows the basic message processing flow when an application sends a message GET request. If an application sends a message GET request 455 to the queue manager of a connected message queuing system 460, the queue manager retrieves the appropriate message from the specified queue and 470, and passes the message descriptor, the source queue name, and the operation type GET to the new message tracking component 480. The new message tracking component generates a new entry in its assigned message trace queue, which also includes the message id, the content key, the queue name, and the operation type GET 490. After a successful storing of this entry, the queue manager sends the message to the requesting application and removes it from the queue 500.

If a message needs to be transferred to another message queuing system, the queue manager again provides the message descriptor, the source queue name, the operation type SND, and additionally in this case, identifiers of the target queue and target queuing system to its assigned message tracking component. This again creates a new entry in the message trace queue, which consists of the message id, the content key, the source queue, the operation type SND, and in this case also of the identifiers of the target queue and target queuing system. Then the queue manager passes the message to the appropriate communication link.

On the receiving message queuing system, the message is passed by the communication link to the queue manager. The queue manager on this system provides the message descriptor, the content key, the target queue, the operation type RCV, and the identifiers of the source queue and source queuing system to the message tracking component. The message tracking component creates a new entry in its message trace queue including the message id, the content key, the name of the target queue, the operation type RCV, and additionally the source queue and source queuing system. After the entry is created successfully, the queue manager stores the message on the specified target queue.

FIG. 4C shows the basic message processing flow when a queue manager receives a search request. When a message administrator wants to search for a message with a specific content, it sends a message search request message to the queue manager 510 of the connected message queuing system (see FIG. 4; 410). The search request message contains the content key to search for. This message is passed to the queue manager. The queue manager passes the search request to the message search component 515. The message search component creates an internal search request message 520 from the received message search request and sends it to all its adjacent message queuing systems 525. This internal search request includes the received content key, a unique search request identifier, and an expiration date after which the request becomes invalid. When a queue manager receives 560 an internal message search request 565, it passes the message search request to its message search component 570. The message search component checks the expiration date 575, and checks whether it already has processed a search request with this identifier. If the expiration date has been exceeded 580, the search request is discarded without a response 585. If a search request is a duplicate, the message search component creates a 'duplicate request' response 590, and passes it back to the queue manager 595. If neither is true, the message search component sends this internal search request to its adjacent message queuing systems, and searches, while waiting for the responses, for entries matching the specified content key in its local message trace queue 605, 610. When either all responses have been received or the expiration date has passed 615, the message search component returns the result in an appropriate response message back to the queue manager 620, 625, which sends this response to the originating message queuing system 630.

While the originating message search component is waiting 535 for the responses from the adjacent message queuing systems, the message search component searches on the local message trace queue for entries with the specified content key 530. After either the expiration date has passed, or the responses of all message queuing systems have been received, the message search component creates a response message containing a list of all found (if found) entries 540. This list 545 includes the message id, the queue name, and the name of the message queuing system where the message has been located during the search. The response message is then passed to the queue manager 550. The queue manager returns the response to the requesting message search application 555.

Figure 5A:
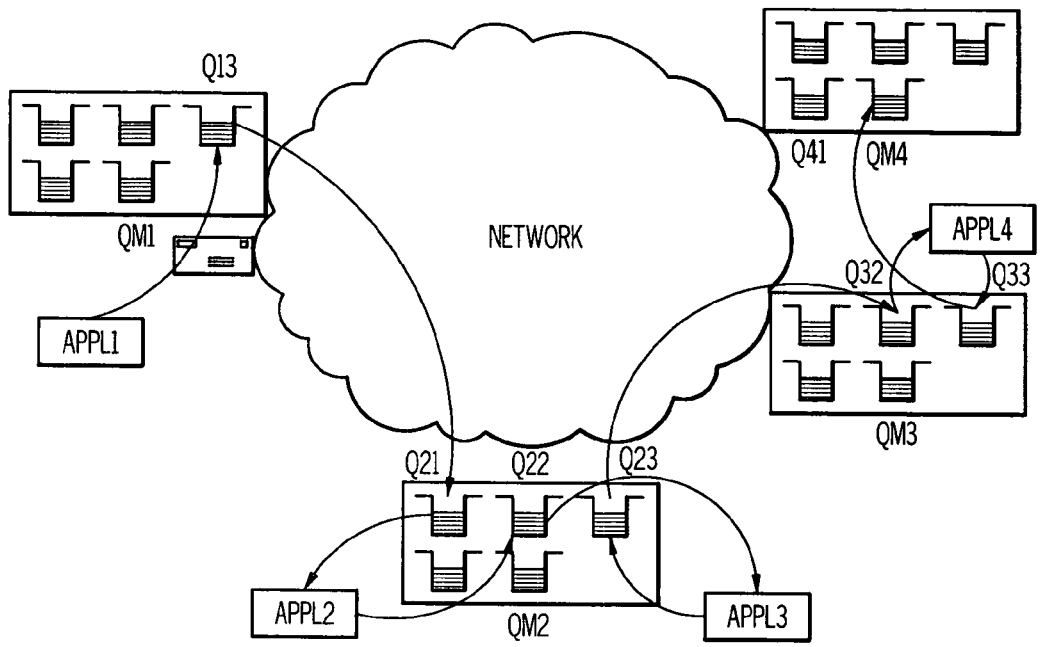
FIGS. 5A-P show examples of message flow in an asynchronous messaging network with its assigned entries in the message trace queue according to the present invention.

FIG. 5A shows a message queuing network that has four single message queuing systems QM 1-4 without the present invention.

Application Appl1 puts a message on a queue Q13 on queuing system QM1. The queuing system QM1 transfers this message to QM2 where it is put on queue Q21. Application Appl2 gets the message from the queue, modifies it, and puts it on queue Q22 on QM2. Application Appl3 gets the message from queue Q22, does its processing, and puts the message on queue Q23. QM2 now transfers the message to message queuing system QM3, where it is put on queue Q32. Application Appl4 gets the message from queue Q32, modifies it, and puts it on queue Q33. QM3 transfers the message to message queuing system QM4, where it is put on queue Q41.

Figure 5B:
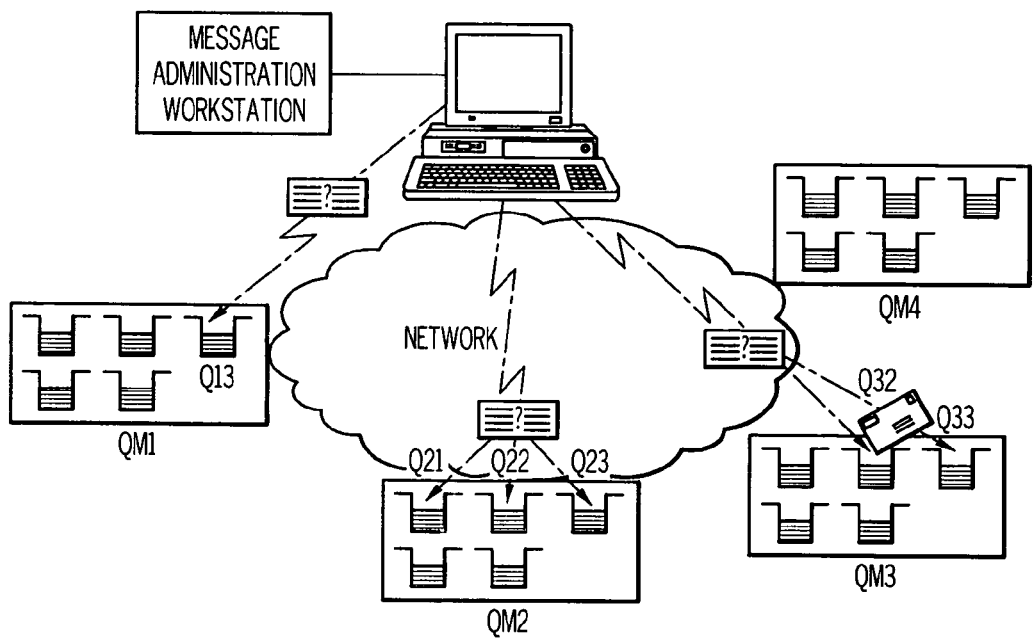

A message administrator who needs to know where a message with a specific content currently is, needs to connect to all participating message queuing systems, and scan all participating queues on each message queuing system for the requested message, as shown in FIG. 5B. But this is a very time and resource consuming task, and the scanning application also needs to know how the message body has to be parsed to find the appropriate values.

Additionally, the message search applications need to know how the message travels through the different message queuing systems to avoid the scanning of queues which are not involved in processing this specific message. Assuming that the message is located on queue Q33 on message queuing system QM3 at the time the message administrator searches for the message, the administrator needs to scan 6 different queues on 3 different queuing systems. If the message had been passed from Q33 on QM3 back to QM1 on queue Q11, the administrator would not find the message with this approach.

Figure 5C:
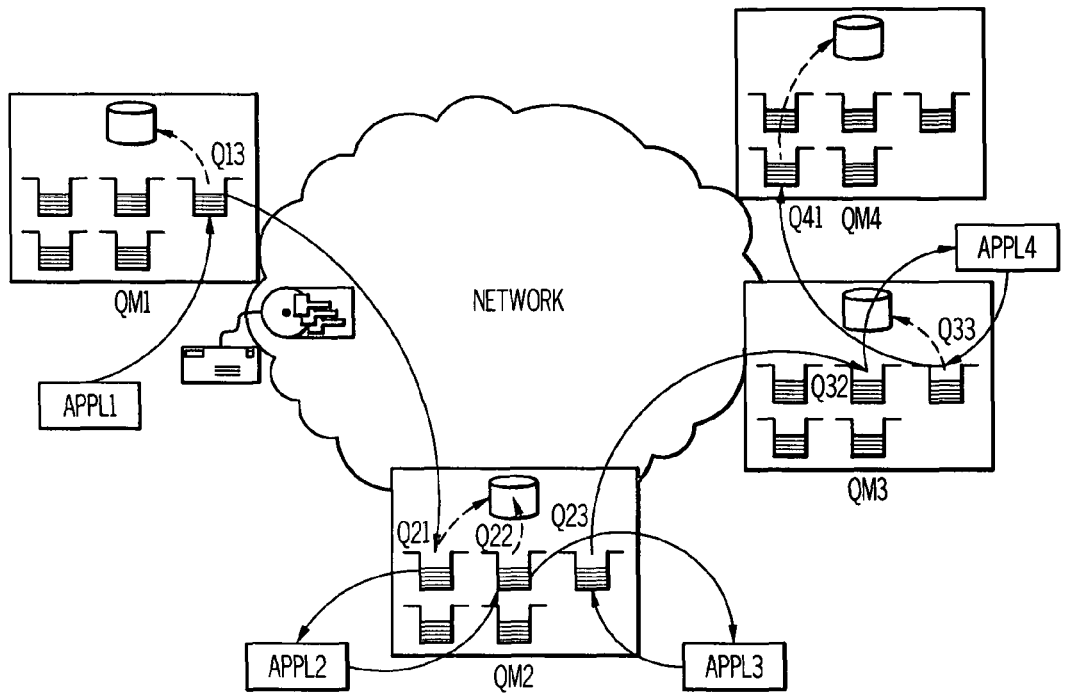

FIG. 5C shows the same message processing as shown in FIG. 5A, but now with the present invention. Each queuing system in the message queuing network holds an additional message trace queue.

The messages in this scenario have the structure shown in FIG. 5A. Application Appl1 initially puts a message on Q13 on message queuing system QM1. The content key of the message is assumed to have the following structure in this example:

Fld1#IBMADEFF#Fld2#
 FE037A2104BA0C4589DE0E7E where value 'FE037A2104BA0C4589DE0E7E' is assumed to be the encrypted value 5.000.000 €

Figure 5D:
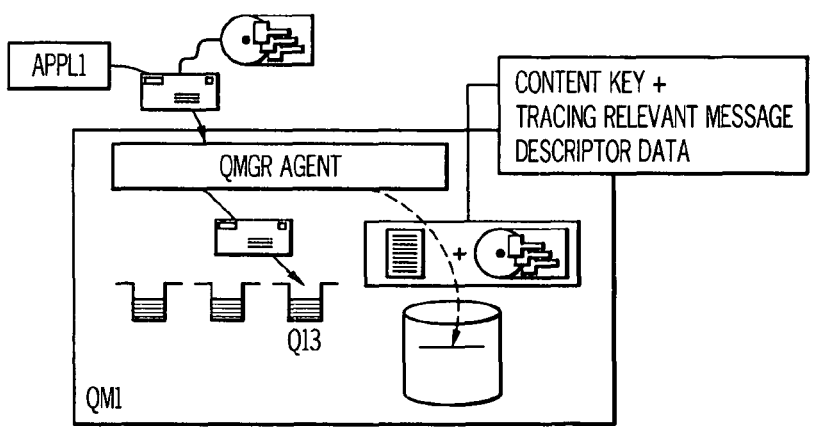

The following figures help to explain this scenario in more detail. In FIG. 5D, the queue manager agent of message queuing system QM1 receives the put request of application Appl1, detects that the content key of the message is set, and creates a trace entry for this message with the specified content key in the message trace queue.

An entry for this "message-put-operation" in the trace queue of QM1 is shown in FIG. 5D.

In this scenario, Q13 is defined as the transmission queue. So QM1 transfers the message to the connected queuing system QM2. A second trace entry is done by the queue manager agent on QM1 for the send operation in FIG. 5E.

Figure 5E:
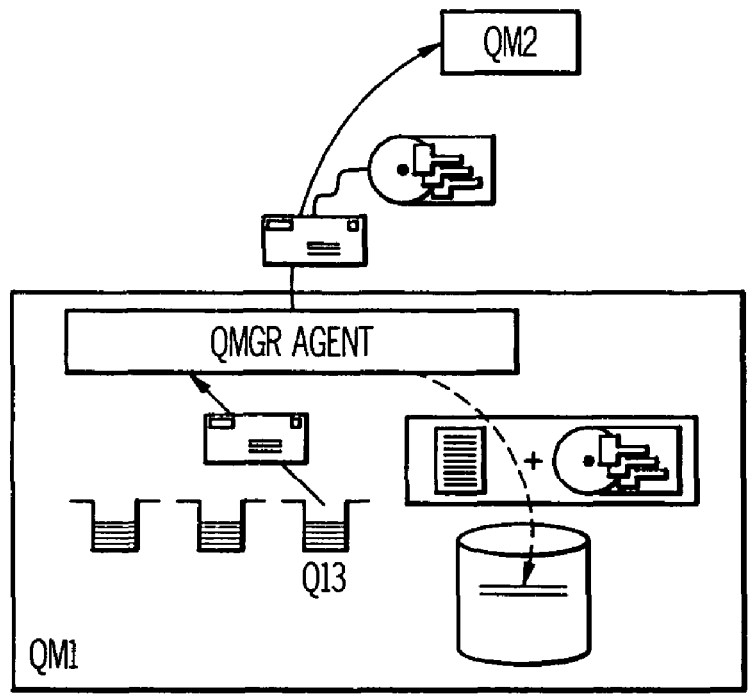

An entry for this "message-send-operation" in the trace queue of QM1 is shown in FIG. 5E.

On queuing system QM2, the message is received and stored in queue Q21. A new trace entry is created by the queue manager agent for the receiving operation of this message.

Figure 5F:
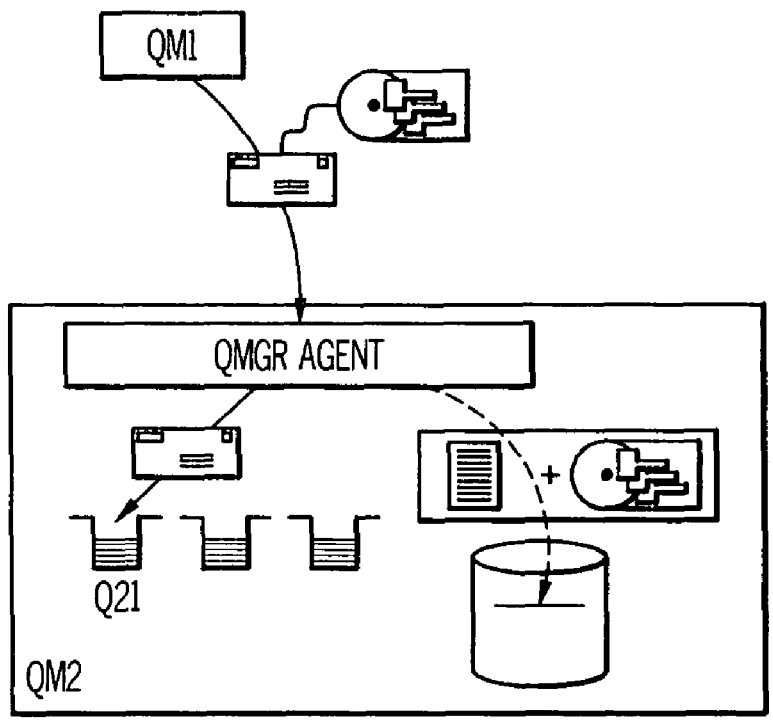

An entry for this "message-receive-operation" in the trace queue of QM2 is shown in FIG. 5F.

Application Appl2 gets the message from Q21 (see FIG. 5G) for which the queue manager agent creates a second entry in the message trace table.

Figure 5G:
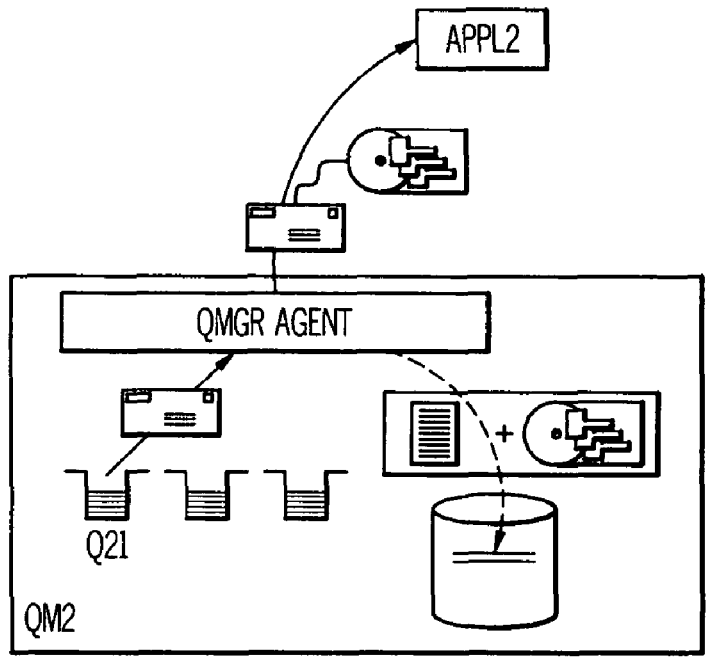

An entry for this "message-get-operation" in the trace queue of QM2 is shown in FIG. 5G.

Application Appl2 processes the message and puts it on queue Q22 on QM2. The queue manager agent then creates another entry in the message trace table.

Figure 5H:
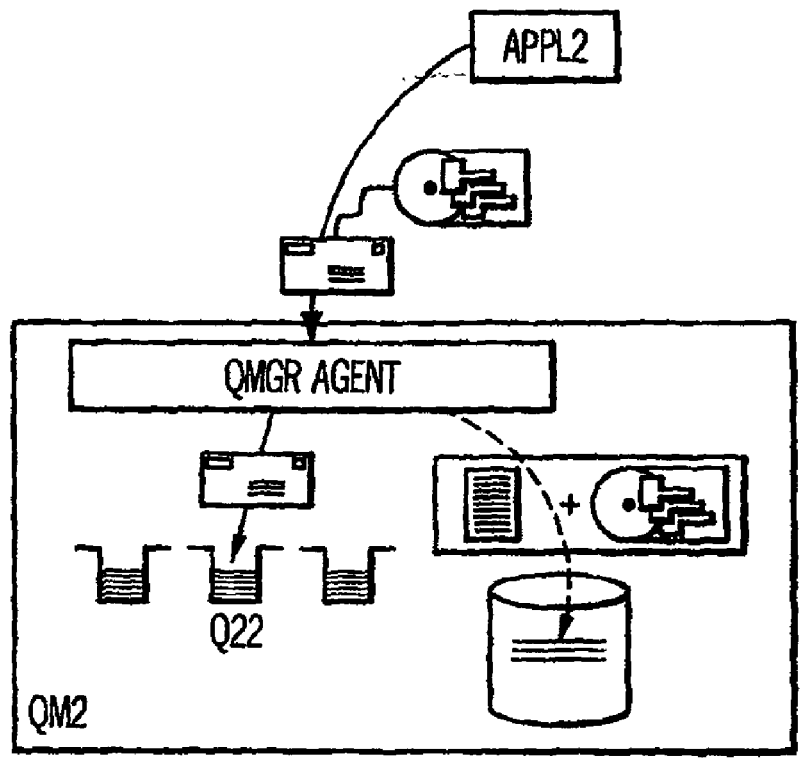
Figure 51:
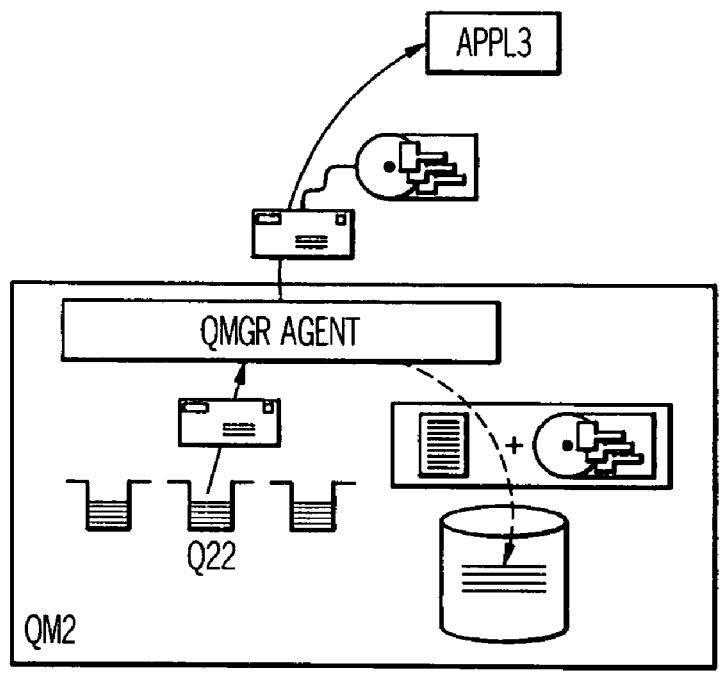

An entry for this "message-put-operation" in the trace queue of QM2 is shown in FIG. 5H.

A third application Appl3 gets the message from queue Q22 and performs its processing on the message. Another entry is created in the message trace table by the queue manager agent for this message get operation.

An entry for this "message-get-operation" in the trace queue of QM2 is shown in FIG. 5I.

Figure 5J:
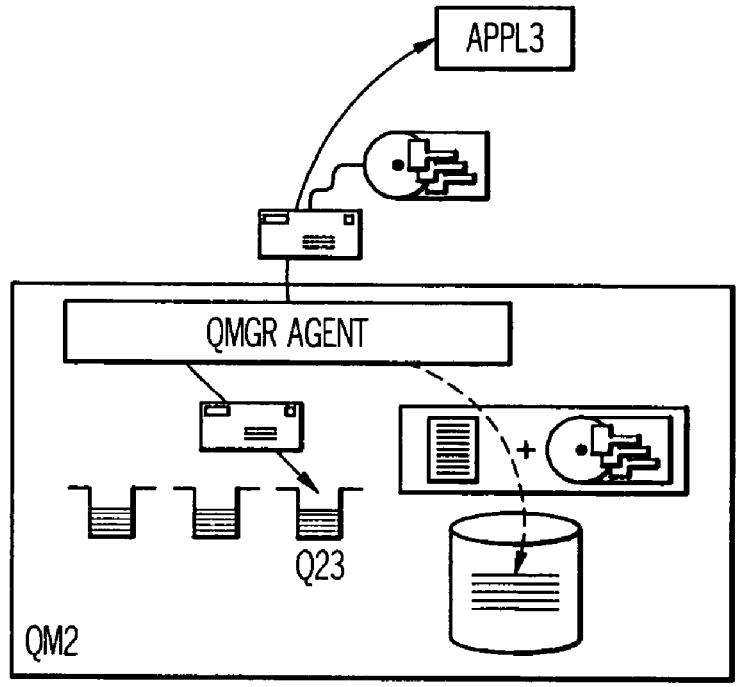

Because Q23 is defined as a transmission queue, the queuing systems transfer the message to the connected queuing system QM3. The appropriate entry in the message trace table is shown in FIG. 5J.

Figure 5K:
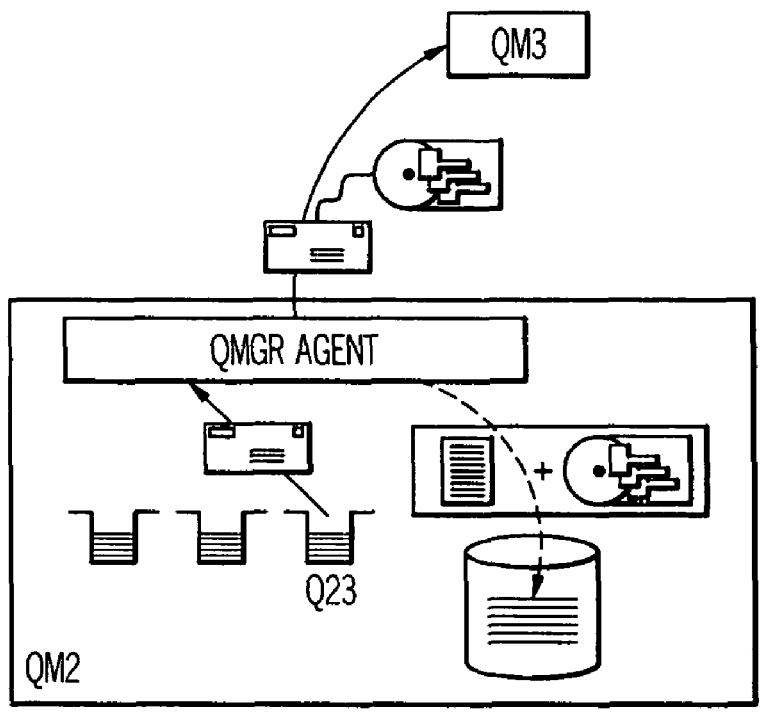

An entry for this "message-send-operation" in the trace queue of QM2 is shown in FIG. 5K.

The queue manager agent of queuing system QM3 receives the message and puts it on queue Q32.

Figure 5L:
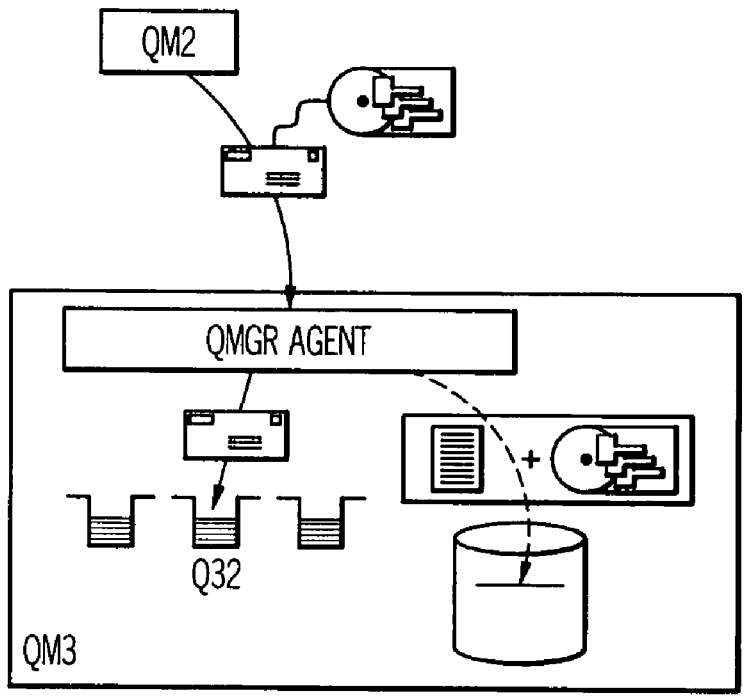

An entry for this "message-receive-operation" in the trace queue of QM2 is shown in FIG. 5L.

Figure 5M:
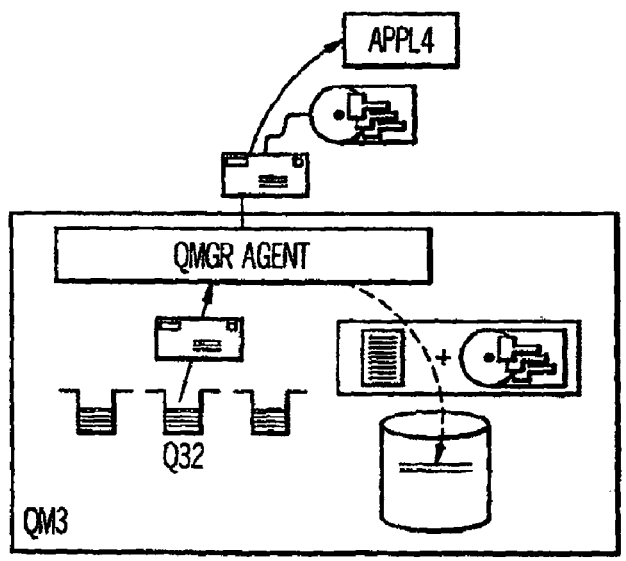
Figure 5N:
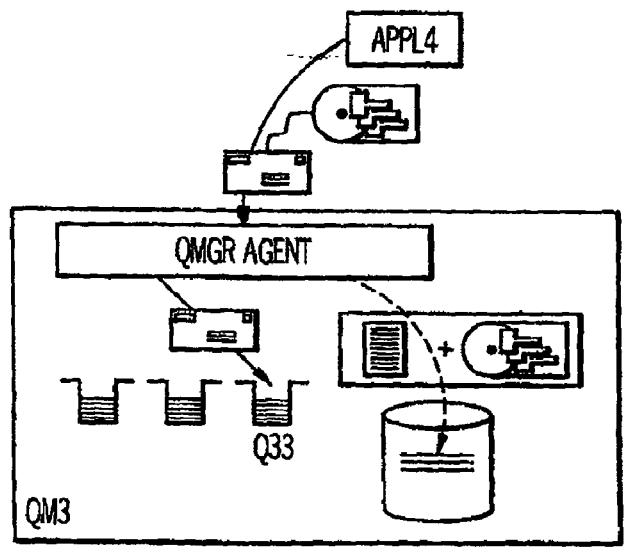
Figure 50:
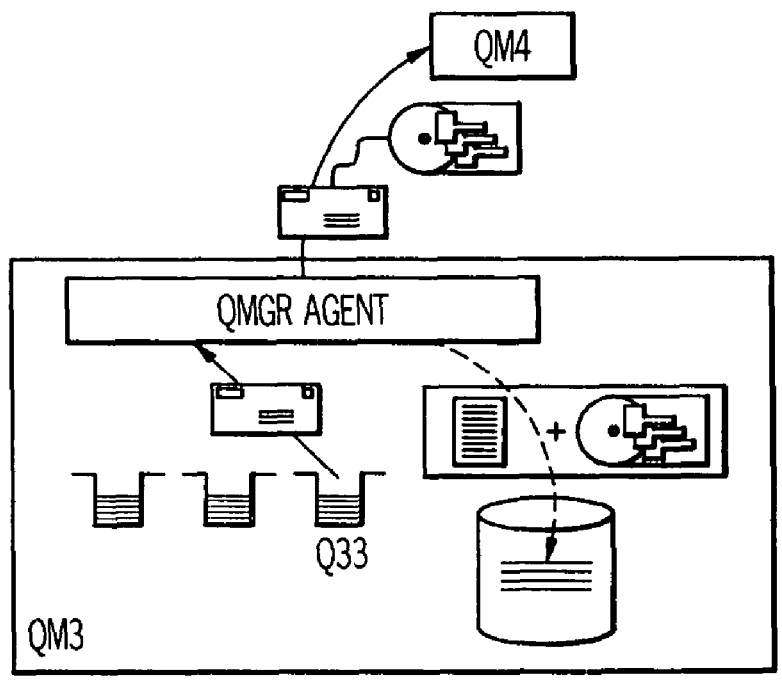

Application Appl4 gets the message from queue 032 (FIG. 5M), performs its processing with the message, and puts it on Q33 (FIG. 5N). Two more entries are created in the message trace table for these two actions by the queue manager agent.

An entry for this "message-put-operation" in the trace queue of QM2 is shown in FIG. 5M.

Application Appl4 put the message, after finishing its processing, on queue Q33.

Q33 is defined as a transmission queue, which causes the queue manager agent to transfer the message to the message queuing system QM4 (FIG. 5O). The last entry for this message is created in the message trace table of QM3.

An entry for this "message-send-operation" in the trace queue of QM2 is shown in FIG. 5O.

Figure 5P:
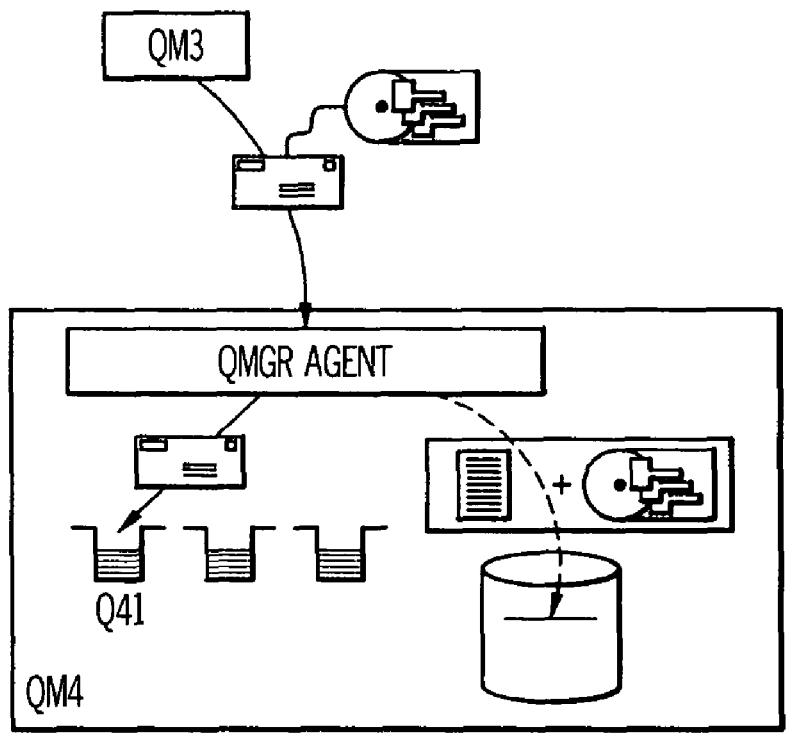

The queue manager agent of message queuing system QM4 receives the message and stores it on queue Q41 (FIG. 5P). The first entry for this message is created in the message trace table of QM4.

An entry for this "message-receive-operation" in the trace queue of QM4 is shown in FIG. 5P.

If a message administrator now needs to determine the location of the message with the content IBMADEFF for the original field LT in the message body and 5.000.000€ for the original field 32A in the message body, the message query application needs to generate the appropriate content key of the specified data. The following translation was defined for this business domain:

Original field LT=Fld1 as label in the content key
Original field 32A=Fld2 as label in the content key
The value of field 32A may be encrypted by the public key of that business domain, which then results in 'FE037A2104BA0C4589DE0E7E'.

Figure 6:
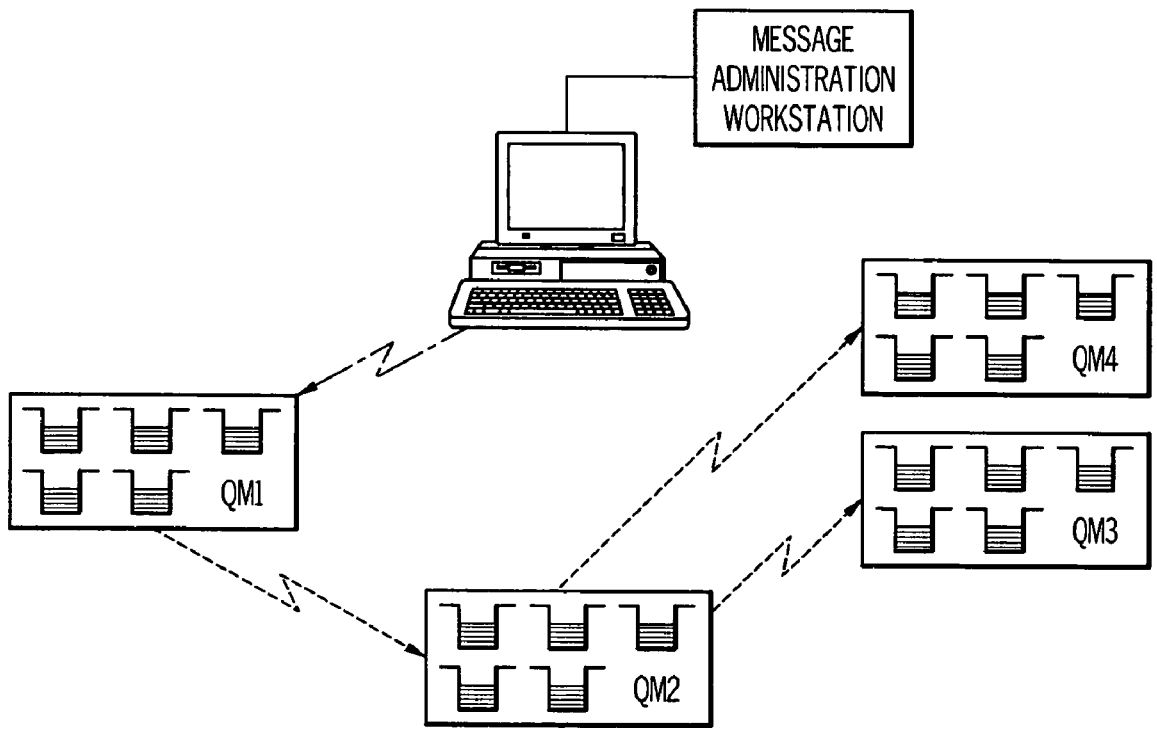
FIG. 6 shows a sample message queuing network with 4 message queuing systems and a search for a message in that network.

FIG. 6 shows a sample of such a message location query. The message query application on a message administration workstation connects, for example, to the initial queuing system QM1, and requests a message query with the content key.

'#Fld1#IBMADEFF#Fld2#
 FE037A2104BA0C4589DE0E7E'.

It is not necessary to provide the same key, as it has been provided with the message, or to provide all the labels. Only labels are specified which have also been specified with the content key of the message.

Message queuing system QM1 searches in the message trace queue for the specified key combination, and finds the appropriate entry. Additionally, it creates an appropriate internal search request, and sends the search request to its adjacent message queuing system QM2. QM2 itself searches on its local message trace key for entries with the requested content key, and additionally sends the search request to its adjacent message queuing systems QM3 and QM4. These two queuing systems also search on their local message trace queues and send the search results back to the requesting queuing system QM2. According to the previous sample, both queuing system will find one or more entries with this content key in their trace queues. Queuing system QM2 now consolidates the results, and sends a response back to queuing system QM1 containing the entry of the latest location of the message with the requested content key. QM1 itself consolidates its local search result with the results from the received responses, and returns a response to the requesting search application containing the latest location of the message with the requested content key. In this sample the latest location would be Q41 on QM4. If more than one message matches the search criteria, the latest locations of all the matching messages are returned.

FIG. 6 shows a sample message queuing network with four message queuing systems, and a search for a message in that network.

A message administrator is connected with a message administration workstation to message queuing system QM1. A list of trace entries on the different message queuing systems is shown. For the purpose of illustration, the content key is reduced to one value, representing a label—value pair, and the time stamp is reduced to a continuous number.

The message administrator in this example sends a message search request for the current location of a message with the content key EAF to the connected message queuing system. The message search component of QM1 (Queue Manager 1) creates the appropriate internal search request and sends it to QM2 (Queue Manager 2), which is the only adjacent queuing system of QM1. QM2 itself sends the search request to QM3 (Queue Manager 3) and QM4 (not to QM1 because it received the request from this queuing system). The search component of each of the queuing searches on its local message trace queue for a matching entry. The result of the search on each queuing system is shown below.

QM1: Nothing found

QM2: Nothing found

QM3: MsgId=123, Content key=EAF, Queue=Q30, Operation=GET

QM4: Nothing found

The message search component of QM2 creates a response based on the three results (QM3, QM4 and itself), and sends the response to QM1. QM1 creates a response for the requesting search application of its own search result and the received response from QM2. So the message administrator will get the following response from QM1:

MsgId=123, Content Key=EAF, Queue=Q30, QMGR=QM3, Operation=GET

According to this, the administrator now knows where the message with this content key was located at the time of the search. It has been removed by an application from queue Q30 on queuing system QM3.

If the message administrator sends a message trace request to the queue manager of queuing system QM1, almost the same happens as described above. But the responses now contain the full history of the messages with the content key EAF. The result of each search component is shown below:

| MsgID | Time stamp | Content key | Q | TQ | TQM | Op |
|---|---|---|---|---|---|---|
| QM1 | | | | | | |
| 123 | 1 | EAF | Qa | | | PUT |
| 123 | 2 | EAF | Qa | Q2a | QM2 | SND |
| QM2 | | | | | | |
| 456 | 1 | CD | Q2b | | | PUT |
| 123 | 2 | EAF | Q2a | | QM1 | RCV |
| 456 | 3 | CD | Q2b | | | GET |
| 123 | 4 | EAF | Q2a | | | GET |
| 123 | 5 | EAF | Q2c | | | PUT |
| 123 | 6 | EAF | Q2c | Q30 | QM3 | SND |
| QM3 | | | | | | |
| 123 | 1 | EAF | Q30 | | QM2 | RCV |
| 123 | 2 | EAF | Q30 | | | GET |
| 987 | 3 | 0815 | Q33 | | | PUT |
| 987 | 4 | 0815 | Q33 | | | GET |
| 999 | 5 | EAF2 | Q34 | | | PUT |
| 999 | 6 | EAF2 | Q34 | Q2e | QM2 | SND |
| QM4 | | | | | | |
| 556 | 1 | UU | Q4a | | | PUT |
| 557 | 2 | UU2 | Q4a | | | PUT |
| 558 | 3 | CD | Q2b | | | GET |
| 557 | 4 | UU2 | Q4a | | | GET |
| 557 | 5 | UU2 | Q4b | | | PUT |

MsgID = message ID
TQ = target queue
TQM = target queue manager
OP = operation applied to the message (e.g. get, put, receive, send)

| MsgId | Time stamp | Content key | Q | TQ | TQM | Op |
|---|---|---|---|---|---|---|
| QM1 | | | | | | |
| 123 | 1 | EAF | Qa | | | PUT |
| 123 | 2 | EAF | Qa | Q2a | QM2 | SND |
| QM2 | | | | | | |
| 123 | 2 | EAF | Q2a | | QM1 | RCV |
| 123 | 4 | EAF | Q2a | | | GET |
| 123 | 5 | EAF | Q2c | | | PUT |
| 123 | 6 | EAF | Q2c | Q30 | QM3 | SND |
| QM3 | | | | | | |
| 123 | 1 | EAF | Q30 | | QM2 | RCV |
| 123 | 2 | EAF | Q30 | | | GET |
| QM4 | | | | | | |

The search component receives the responses of QM3 and QM4, and assembles a response with its own result and sends the assembled response to QM1.

| MsgId | Time stamp | Content key | Q | TQ | TQM | Op |
|---|---|---|---|---|---|---|
| QM2 | | | | | | |
| 123 | 2 | EAF | Q2a | | QM1 | RCV |
| 123 | 4 | EAF | Q2a | | | GET |
| 123 | 5 | EAF | Q2c | | | PUT |
| 123 | 6 | EAF | Q2c | Q30 | QM3 | SND |

-continued

| QM2 | | | | | | |
|---|---|---|---|---|---|---|
| MsgId | Time stamp | Content key | Q | TQ | TQM | Op |
| 123 | 1 | EAF | Q30 | | QM2 | RCV |
| 123 | 2 | EAF | Q30 | | | GET |

QM1 receives the response of QM2 and assembles the final response for the requesting application with its result set.

| QM1 | | | | | | |
|---|---|---|---|---|---|---|
| MsgId | Time stamp | Content key | Q | TQ | TQM | Op |
| 123 | 1 | EAF | Qa | | | PUT |
| 123 | 2 | EAF | Qa | Q2a | QM2 | SND |
| 123 | 2 | EAF | Q2a | | QM1 | RCV |
| 123 | 4 | EAF | Q2a | | | GET |
| 123 | 5 | EAF | Q2c | | | PUT |
| 123 | 6 | EAF | Q2c | Q30 | QM3 | SND |
| 123 | 1 | EAF | Q30 | | QM2 | RCV |
| 123 | 2 | EAF | Q30 | | | GET |

The message administrator now has the whole trace of the message through the messaging network, from the initial entry into the messaging network up to the last location of the message on QM3.

The invention claimed is:

1. A messaging network including a plurality of message queuing systems communicating with one another via communication links, each message queuing system comprising:
a queue manager for queuing messages it receives onto an appropriate queue, and retrieving the messages in response to an application request or a message queuing request;
at least one queue for queuing the messages;
a message trace queue for storing message trace information for incoming and outgoing messages,
a message tracking component for receiving the message trace information from the queue manager and storing the message trace information in the message trace queue; and
a message search component for receiving message search requests including at least a content key to be searched for, searching for the content key in the message trace information stored in the message trace queue, wherein the content key is application and message specific, and has at least one label with its assigned values, where the label identifies a specific data element derived from the message body or from the message descriptor, and providing a search result, wherein
the message trace queue comprises:
a message trace table in a database for recording each operation performed on a message within the message queuing system as a message trace entry in the message trace table wherein each
message trace entry includes a message id, the content key of the message, an operation performed on the message, an identifier of a source queue within the message queuing system,
identifiers of a target queuing system and a target queue within the target queuing system, and a time stamp of the message trace entry, wherein an operation performed on a message includes one of a message-receive-operation, a message-put-operation, a message-get-operation, and a message-send-operation; and
a message content table in the database, the message content table stores a message ID only once for each message, and a label with its assigned value.

2. The messaging network according to claim 1, wherein the content key is provided as a part of a message descriptor of the message.

3. The messaging network according to claim 1, wherein the message search component generates internal message search requests, sends the internal message search requests to adjacent queue managers, receives replies from the adjacent queue managers, consolidates the received replies, and provides a reply to a requesting search application.

4. A method for processing messages in a messaging network, wherein said messaging network includes a plurality of message queuing systems communicating with one another via communication links, wherein each message queuing system includes at least a queue manager for queuing messages it receives onto an appropriate queue, and retrieving the messages in response to a request, and at least one queue for queuing messages, wherein said method comprises:
providing within each message queuing system a message trace queue for storing message trace information for incoming and outgoing messages, wherein the message trace queue includes a message trace table in a database for recording each operation performed on a message within the message queuing system as a message trace entry in the message trace table, wherein each message trace entry includes a message id, a content key of the message, an operation performed on the message, an identifier of a source queue within the message queuing system, identifiers of a target queuing system and a target queue within the target queuing system, and a time stamp of the message trace entry, wherein an operation performed on a message includes one of a message-receive-operation, a message-put-operation, a message-get-operation, and a message-send-operation; and
searching for the content key in the message trace information stored in the message trace queue upon receiving a message search request including at least a content key to be searched for, wherein the content key is application and message specific, and has at least one label with its assigned values, where the label identifies a specific data element derived from the message body or from the message descriptor,
and providing a search result.

5. The method according to claim 4, further comprising:
receiving a search request from a search application;
creating an internal search request from the received search request, wherein the internal search request includes a content key, a unique search request identifier, and an expiration date;
sending the internal search request to adjacent message queuing systems;
searching on a local message trace queue for matching entries with the content key;
waiting for expiration of all responses of the adjacent message queuing systems;
consolidating the received responses;
creating a search result; and
providing the search result to the requesting search application.

6. The method according to claim 5, wherein the search result is presented as a list including a message id, a queue name, and a name of a message queuing system where the message has been located by the search.

7. A computer readable storage device having stored thereon a computer program, said computer program comprising computer readable program code comprising a routine set of instructions, which when executed by a computer, cause a message network to perform the steps of:

provided, within each message queuing system in a messaging network including a plurality of message queuing systems communicating with one another via communication links, a message trace queue for storing message trace information for incoming and outgoing messages, wherein the message trace queue includes a message trace table in a database for recording each operation performed on a message within the message queuing system as a message trace entry in the message trace table, wherein each message trace entry includes a message id, a content key of the message, an operation performed on the message, an identifier of a source queue within the message queuing system, identifiers of a target queuing system and a target queue within the target queuing system, and a time stamp of the message trace entry, wherein an operation performed on a message includes one of a message-receive-operation, a message-put-operation, a message-get-operation, and a message-send-operation; and searching for the content key in the message trace information stored in the message trace queue upon receiving a message search request including at least a content key to be searched for, wherein the content key is application and message specific, and has at least one label with its assigned values, where the label identifies a specific data element derived from the message body or from the message descriptor, and providing a search result.

* * * * *